G. MORGAN ELDRIDGE.
IMP.ᵗ in AUTOMATIC FIRE REGULATOR.
No. 123,252.    Patented Jan. 30, 1872.
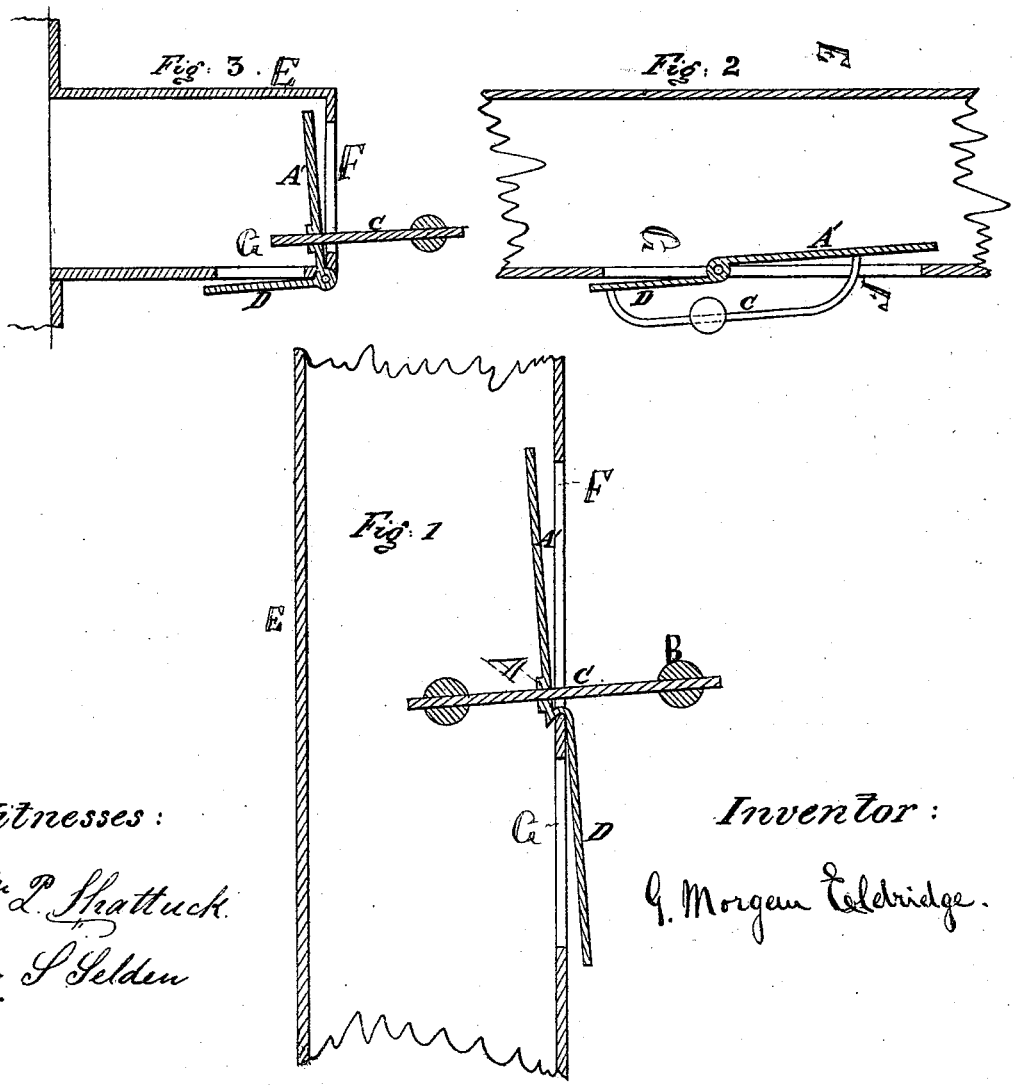

123,252

UNITED STATES PATENT OFFICE.

G. MORGAN ELDRIDGE, OF PHILADELPHIA, PENNSYLVANIA.

IMPROVEMENT IN AUTOMATIC FIRE-REGULATORS.

Specification forming part of Letters Patent No. 123,252, dated January 30, 1872.

*To all whom it may concern:*

Be it known that I, G. MORGAN ELDRIDGE, of Philadelphia, in the county of Philadelphia and State of Pennsylvania, have invented certain Improvements in Automatic Fire-Regulators, of which the following is a specification, reference being had to the accompanying drawing, in which like letters represent like parts.

My invention relates to the application, to the pipe or flue of a stove or other receptacle of fire, of a damper, consisting of a valve or valves covering apertures in the pipe, and opening automatically by atmospheric pressure as a partial vacuum is caused inside by the draught of the chimney; the object of my invention being to maintain an even draught upon the fire, and thus a regular heat.

Description of the Accompanying Drawing.

Figure 1 is a side elevation of a damper in a pipe embodying my invention. Fig. 2 is the same applied to a horizontal pipe. Fig. 3 is the same applied to a pipe not in contact with cold air.

General Description.

In Fig. 1, A is a damper, consisting of the valves A' and D, placed in the side of a stove-pipe, E, in which are apertures F and G, covered by the valves, between which is a bearing, upon which the damper rests. The larger valve A', which is nearer the chimney, opens inward, and the smaller valve D opens outward. C is a balance-rod, which passes through the damper, at or near the pivot, and is adjustable, or which may be fixed with a movable weight upon it. The damper standing closed, with the rod balanced, and no draught on the chimney, the pipe will be open and free inside, and the outer air will be excluded; but as soon as there is any draught in the chimney the damper will be opened, admitting the outer air, and checking the fire, unless prevented by the weight on the balance-rod, which will be placed in such a position as to cause the desired draught to be maintained. When that draught or vacuum is reached the damper will open, and, admitting air through the apertures into the pipe, will prevent any increase of draught, and thus a constant and regular combustion of the fuel will be maintained at such draught as may be desired.

Claims.

I claim as my invention—

1. The damper A, consisting of the combined differential valves A' and D, for application to a stove-pipe or flue, to operate in the manner substantially as described.

2. The combination of the damper A, consisting of the valves A' D, with the pipe E, in which are the apertures F and G, substantially as and for the purpose hereinbefore set forth.

G. MORGAN ELDRIDGE.

Witnesses:
 GEO. S. SELDEN,
 W. M. WHITE.